Aug. 2, 1960    M. P. HERSHEY    2,947,341
TUBELESS TIRE

Filed Aug. 15, 1957    5 Sheets-Sheet 1

MELVIN P. HERSHEY
*INVENTOR.*

BY *William A. Fraser*

ATTY.

Aug. 2, 1960                 M. P. HERSHEY                 2,947,341
                              TUBELESS TIRE
Filed Aug. 15, 1957                                        5 Sheets-Sheet 2
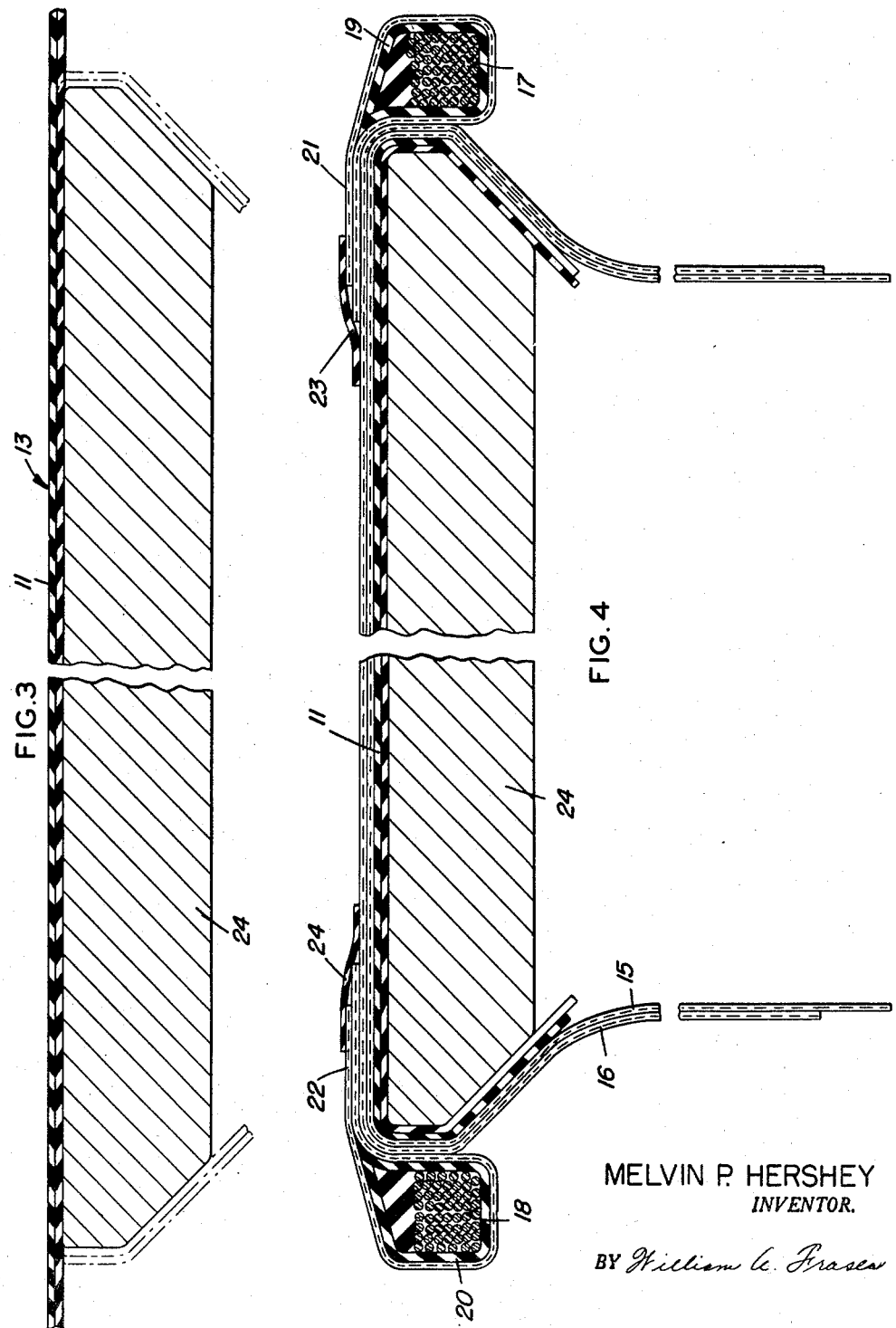
MELVIN P. HERSHEY
      INVENTOR.
BY William A. Fraser
                    ATTY.

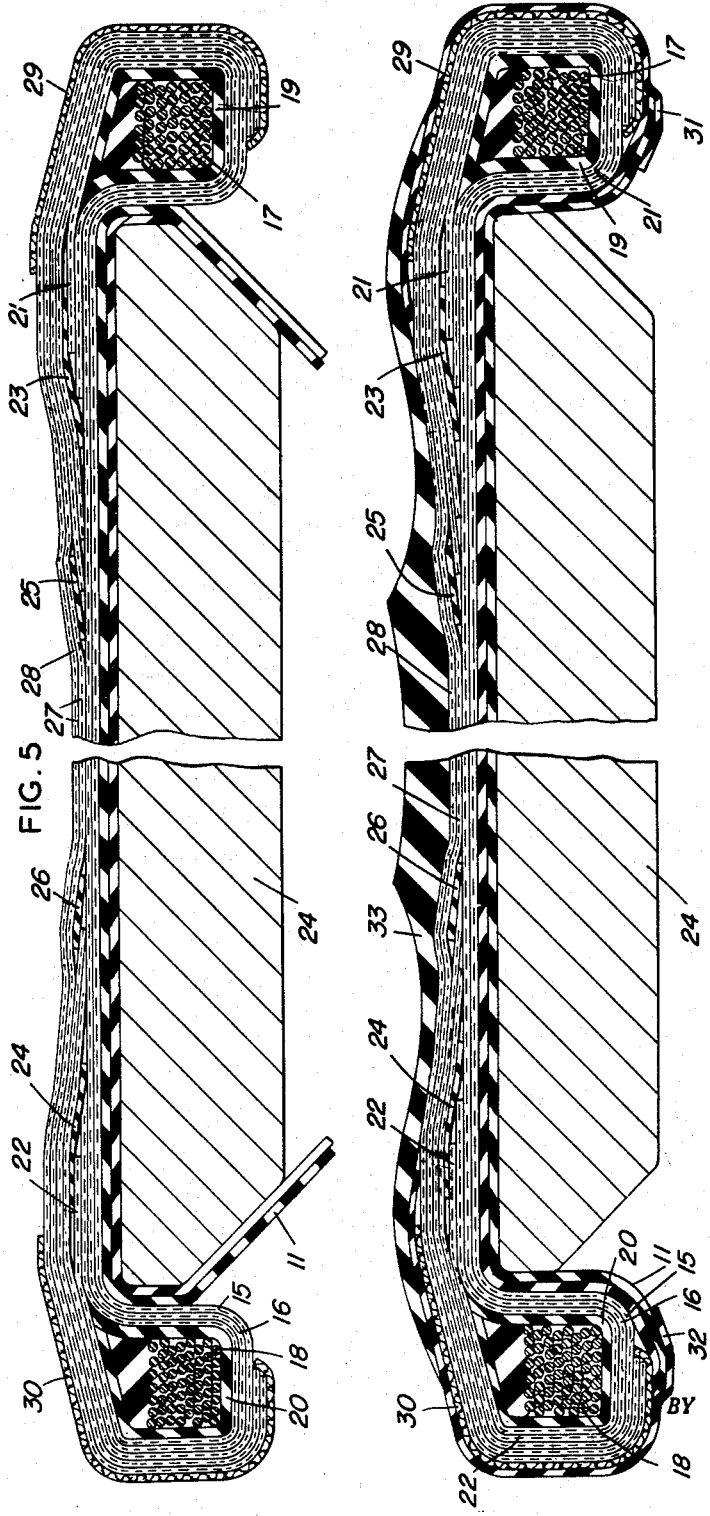

Aug. 2, 1960 M. P. HERSHEY 2,947,341
TUBELESS TIRE
Filed Aug. 15, 1957 5 Sheets-Sheet 5

INVENTOR
MELVIN P. HERSHEY
BY *William A. Fraser*
ATTORNEY

United States Patent Office 2,947,341
Patented Aug. 2, 1960

2,947,341

TUBELESS TIRE

Melvin P. Hershey, Akron, Ohio, assignor to The Firestone Tire & Rubber Company, Akron, Ohio, a corporation of Ohio Filed Aug. 15, 1957, Ser. No. 678,280

8 Claims. (Cl. 152—362)

This invention relates to pneumatic tires and, more particularly, to tubeless tires having chafer strips around the bead portions thereof.

Pneumatic tires are conventionally provided with rubber-coated fabric chafer strips which are disposed around the tire beads. The term "tire bead" is used loosely in the tire industry and it is to be understood that in the present application "tire bead" refers to the radially inner edge portion of an open-bellied pneumatic tire. The chafer strips extend across the radially inner edges of the tire beads and up the tire sidewalls for a short distance to protect the tire beads from injury due to chafing against the side flange and bead seat of the rim on which the tire is mounted. The repeated and severe abrasion to which the tire beads are subjected, particularly during sudden starting and stopping, frequently removes the rubber coating covering the chafer fabric to the extent that portions of the chafer fabric are exposed.

Because an air-tight seal must be maintained between the tire beads of tubeless tires and the corresponding bead seating surfaces of the rim to retain the inflationary air in the tire, the exposure of the chafer strips in such tires presents a particularly serious problem. The inflationary air need only travel to the toe of the bead or slightly beyond to contact the exposed chafer. Certain prior art tubeless tire chafer strips are woven from pervious multi-filament cotton, rayon or nylon cords or threads. When such chafers become exposed, the inflationary air is permitted to pass freely along the full length of the cords or threads and spread throughout the entire chafer. Some of this air escapes entirely which results in loss of tire pressure. Further, much of the escaping air finds its way into the tire ply fabric and causes ply separation when the tires are run in service.

In my co-pending application entitled "Tubeless Tire," Serial No. 623,361, filed November 20, 1956, there is disclosed a woven chafer strip having monofilament warp and filling elements, each composed of air-impervious plastic material such as nylon. Such chafer strips are advantageous in tubeless tires because the inflationary air is precluded from passing through the monofilament warp and filling elements.

To overcome the disadvantages of the chafer strips employed in prior art tires, it is a primary object of this invention to provide a tire having an improved chafer strip of woven monofilament material which is characterized by increased resistance to abrasion.

It is an additional object of this invention to provide a tubeless tire having an easily fabricated, air-impervious, woven chafer strip which is highly resistant to abrasion and leakage of inflationary air.

It is a further object of this invention to provide a tubeless tire having an improved chafer strip woven from air-impervious, organic plastic warp and filling elements which is characterized by increased resistance to abrasion and sidewall blistering.

A particular object of this invention is a tubeless tire having an improved chafer strip woven from monofilament nylon cord and which is characterized by enhanced resistance to abrasion, ply separation and sidewall blistering.

The chafer strips of the present invention are especially advantageous in truck tires and other heavy-duty tires, the bead portions of which are subjected to especially severe abrasion against the tire rims during operation.

Generally described, the invention relates to a pneumatic tubeless tire which is provided with a chafer strip of woven fabric having monofilament warp and filling elements of abrasion-resistant, air-impervious material, the intersecting portions of said elements being flattened on the outwardly facing side of said fabric to provide abrasion-resistant bearing surfaces of substantial area. Warp and filling elements of monofilament synthetic resin polymers such as nylon are preferred. The chafer strips of the invention are woven by any conventional manner and the intersecting portions of the warp and filling elements are preferably flattened by a hot calendering operation or by pressing the fabric between hot plates.

The invention having been generally set forth, a preferred specific embodiment which accomplishes one or more of the stated objects and others will now be described in detail with reference to the accompanying drawings in which:

Figure 3 is a fragmentary sectional view taken through a tire-building drum showing the lining of Figure 2 in its initial position on said drum;

Figures 4, 5 and 6 are similar to Figure 3 showing further successive steps in the building of the tire and showing the application of the imperivous chafer strip in Figure 6;

Figure 1:
Figure 1 is a sectional view of a lining component for a tubeless tire embodying the present invention.
Figure 2:
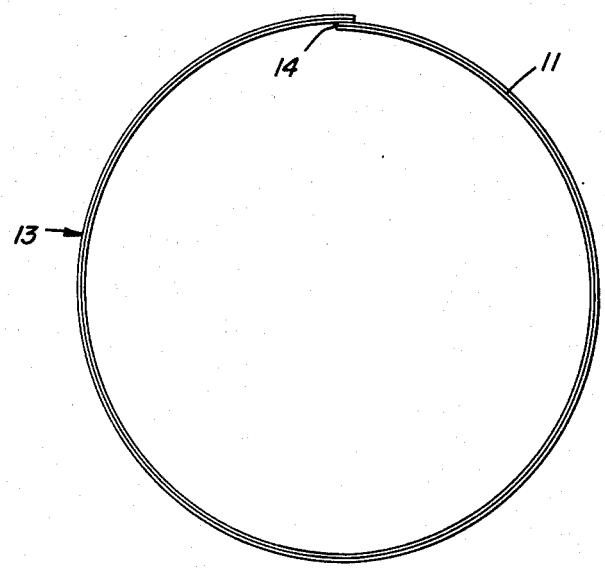
Figure 2 is a side elevation of the lining of Figure 1 shown formed into a band preparatory to being applied to a tire-building drum.

Referring to Figure 1 of the drawings, there is shown a cross-sectional view of a strip 11 of two plies of calendered air-impermeable rubber or butyl compound. Strip 11 is of such width as will completely line the inside of a tubeless tire, identified by the reference numeral 12 in Figure 7, in which it is to be used and having additional width to permit the edges of the strip to be turned radially outwardly about the bead edge portion of the tire after the chafers of said tire have been applied. Although such lining may be of any thickness found satisfactory, applicant has found .070" preferable for an 8.00–15 tire. Preparatory to applying the lining to a tire-building drum, a suitable length is formed into a band 13 on a band-building drum (not shown), the band having a transverse splice 14 of approximately ¼". Said assembly of band 13 is slipped upon said drum as shown in Figure 3. Next, edge portions of band 13 are turned radially inwardly about the shoulders of the tire-building drum 24 to the position indicated by the phantom lines in Figure 3. Tire plies of rubberized cotton, rayon or nylon cord fabric are next applied on the drum over band 13. Tire ply 15, and then ply 16 are applied in the usual manner of tire building, it being noted, however, that the edges of these plies are stitched about the shoulder of the tire drum over band 15 and said ply edges are permitted to remain extending loosely radially inwardly over the shoulder of the drum. It has also been found desirable to have ply 15 somewhat wider than ply 16, thus providing a step-off between the edges of these plies as shown. After plies 15 and 16 are applied and stitched over the shoulders of the drum as just explained, tire beads 17 and 18, having bead covers 19, 20 and flippers or tire bead reinforcing strips 21 and 22, respectively, are placed by bead seating rings or otherwise in position at the shoulders of the drum against ply 16. Gum strips 23 and 24 are placed over the edges of said flippers 21 and 22, respectively, following common practice in tire building.

Figure 8:
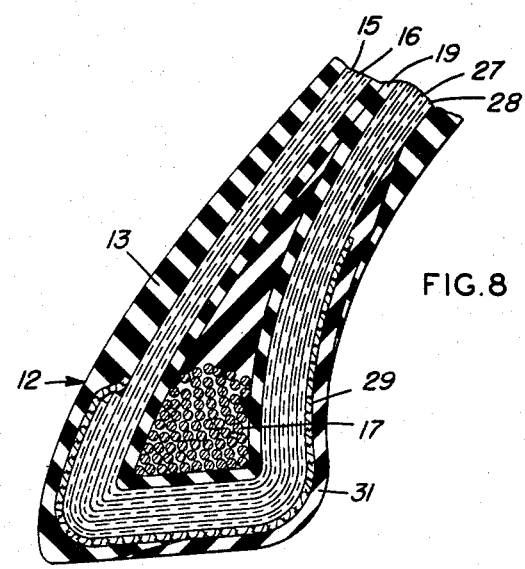
Figure 8 is an enlarged fragmentary sectional view showing one of the bead portions of the tire illustrated in Figure 7.

Referring now to Figure 5, the edges of plies 15 and 16 are next turned up and back around the tire beads as indicated in the drawing. Gum strips 25 and 26 are then applied over the turned back edges of plies 15 and 16 also in accordance with common practice. Next, single plies 27 and 28 are drawn about the drum in superimposed relation to plies 15 and 16 and the other components of the tire previously assembled. The edges of plies 27 and 28 are turned down around the beads as indicated in the drawings after which chafer strips 29 and 30 are applied to ply 28 at the shoulders of said building drum. Next, the edges of lining 11 are turned radially outwardly about the lower edge of the tire beads and over said chafers 29 and 30 a distance that results in lining 11 terminating at the toe of the bead of the tire, as shown in Figure 8. The succeeding operation is the application of rubber abrasive strips 31 and 32, these latter strips being disposed over said chafing strips and extending a short distance beyond the edges thereof. An unvulcanized tire tread 33 is disposed about the previously assembled components of the tire in the usual manner of drum building of tires after which tire drum 24 is collapsed and the assembled, so-called green, tire removed therefrom, preparatory to molding and vulcanization.

Figure 7:
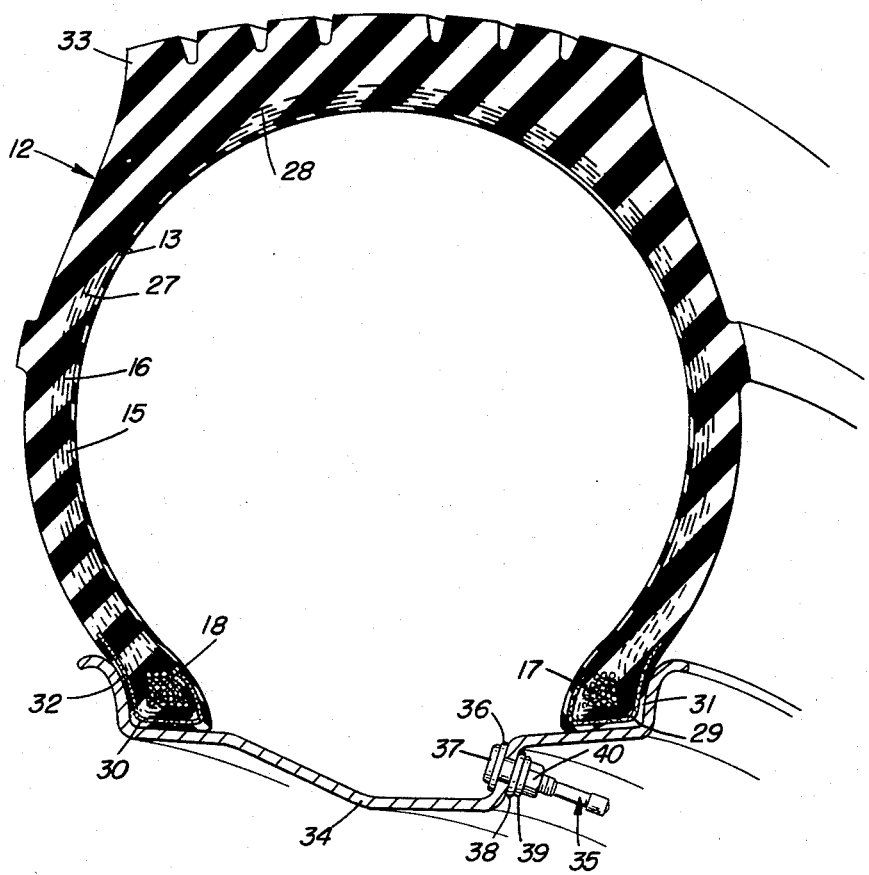
Figure 7 is a radial sectional view of a molded and vulcanized tire embodying the present invention and being composed of the components shown in Figure 6 illustrating the manner in which the inner liner and impervious chafer strip are employed in combination with said tire.

With reference to Figure 7, the finished tire 12 is shown mounted upon rim 34. A conventional inflating valve 35 is mounted in fluid-tight connection with tire rim 34 having a seal therewith by means of a rubber washer 36 disposed between the base 37 of valve 35 and rim 34. A further seal is provided by a rubber gasket 38 between a rim washer 39 and rim 34. Washers 36 and 39 are pressed against the rim 34 by means of a nut 40 as will be understood by those familiar with the art. If desired, valve 35 may be welded or otherwise attached to rim 34 to establish a fluid-tight relation therebetween.

Figure 9:
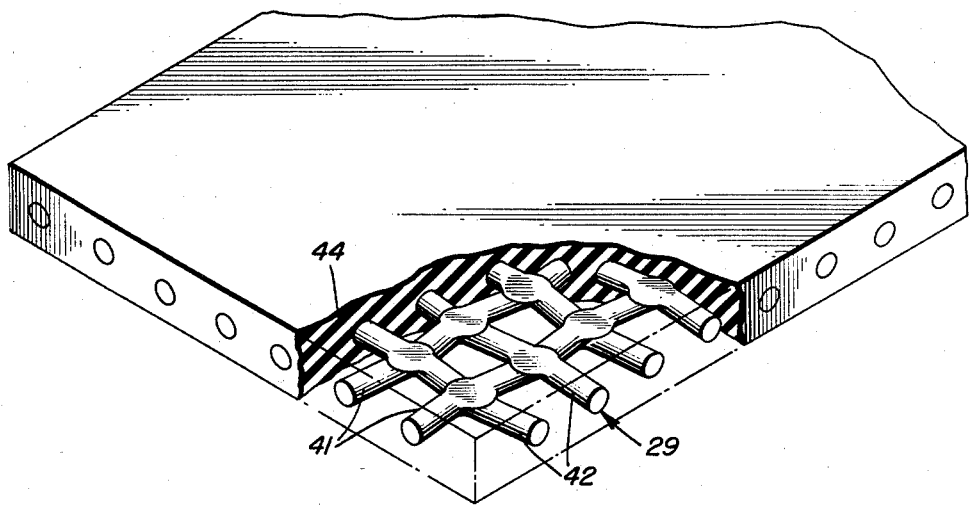
Figure 9 is a partially broken away perspective view of a woven monofilament chafer strip according to the invention, which strip is embedded in rubber.
Figure 10:
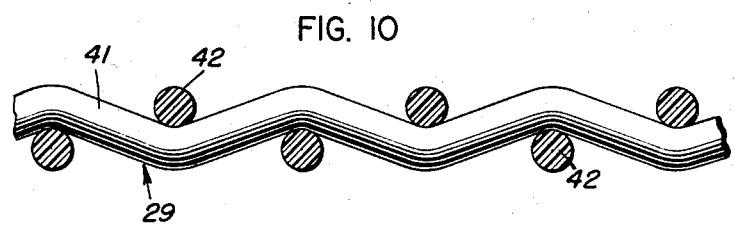
Figure 10 is a sectional view taken through a woven monofilament chafer strip before the intersecting portions of the warp and filling elements are flattened.
Figure 11:
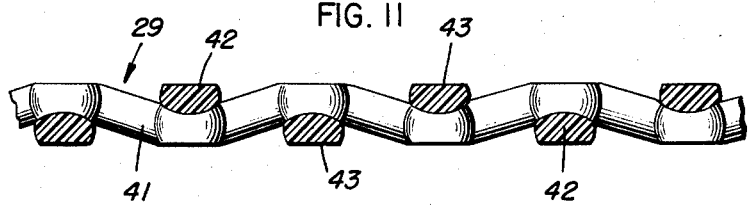
Figure 11 is a sectional view of a woven monofilament chafer strip after the intersecting portions of the warp and filling elements have been flattened in accordance with the invention by a hot calendering operation.

With reference to Figures 9, 10 and 11, the chafer strips 29 and 30 comprise warp threads or elements 41 and weft or filling threads or elements 42 which are woven in any suitable manner into an open-weave fabric, i.e., a fabric wherein the warp and filling elements touch each other only at their points of crossing. As shown in Figure 11, the intersecting portions of the warp and filling elements are flattened into a generally elliptical cross section to provide a substantially enlarged exterior bearing area at each of the intersections and enlarged complementary bearing surfaces between the warp and filling elements. Thus, the intersecting portions of the warp and filling elements are larger in width and smaller in depth than the portions of said elements between the intersections. Preferably flat faces 43 are formed on the exterior sides of the fabric at the intersections of the warp and filling elements. A chafer strip having the flattened configuration shown in Figure 11 is characterized by greatly increased resistance to abrasion. The chafer strips 29 and 30 are preferably embedded in a layer of rubber 44 as shown in Figure 9.

Each of the warp and filling elements of the chafer strip of the invention preferably consists of an air-impermeable, abrasion-resistant monofilament of nylon. It will be understood that other suitable air-impermeable, abrasion-resistant materials may be used in lieu of nylon. Synthetic resin polymers in monofilament form are preferred and include, without limitation, vinyl resins such as polyvinyl chloride, copolymers of vinyl chloride and vinyl acetate, and the like; vinylidene chloride polymers and copolymers such as vinylidene chloride-acrylonitrile (Saran) and the like; and the polyester resins such as the styrene-polyester resins, "Dacron," and the like. The term "Dacron" is a trade name for a polyester of methyl terephthalate and ethylene glycol having the formula:

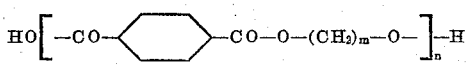

wherein $m$ represents an integer within the range of 2 to 10, and $n$ represents a large number approximately in the range of 50 to 200.

The monofilament warp and filling threads may vary in size. A preferred range of thread sizes is from .010 to .060 gauge square woven into a fabric having a cord count per inch of from 8 x 8 to 50 x 50.

While the intersecting portions of the warp and filling elements of the chafer strip of the invention may be flattened by any suitable procedure, it is preferred to employ a hot calendering operation. The hot calendering step preferably is conducted immediately following the weaving operation and thus makes preparation of the chafer strip material a continuous operation.

As an alternative to hot calendering, the woven fabric may be pressed between hot plates. Additionally, it is possible to preform in any suitable manner the monofilaments with a configuration substantially as described above and then weave them to obtain a chafer strip substantially identical to the calendered fabric. This expedient, however, is not as convenient as hot calendering or pressing because of the relative difficulty encountered in forming, handling and weaving the thus flattened filaments.

The chafer strip fabric may be rubberized by being run through a rubber-cement bath, then dried and calendered by skim coating the first side, frictioning the second side and skim coating the second side to achieve the desired thickness.

*Example*

Comparative tests were performed on samples of unmodified fabric as shown in Figure 10 and calendered fabric as shown in Figure 11 to determine the relative resistance to abrasion of the two types of fabric. Both the calendered and uncalendered test fabrics were woven from .02" gauge monofilaments of nylon with a cord count of 15 x 15 cords per inch. Each sample of test fabric was clamped against a platform and two abrasion wheels, which were carried by a common axle, were moved into contact with the surfaces of the fabric samples. Both the abrasion wheels and the platform carrying the fabric were rotated. The uncalendered fabric failed after 100 revolutions of the abrasion wheel, whereas the calendered fabric withstood 250 revolutions of the abrasion wheel before failure. It was thus demonstrated that the calendered fabric is two and one-half times as resistant to abrasion as the unmodified fabric.

There has been illustrated and described what is considered to be a preferred embodiment of the invention. It will be understood, however, that various modifications may be made by persons skilled in the art without departing from the scope of invention as set forth in the appended claims.

I claim:

1. In a pneumatic tubeless tire, a chafer strip of woven fabric having monofilament warp and filling elements of abrasion-resistant, air-impervious material, the intersecting portions of said elements being flattened on the outwardly facing side of said fabric and having a thickness greater than either element to provide abrasion-resistant exterior bearing surfaces of substantial area.

2. A tubeless tire according to claim 1 wherein said warp and filling elements are formed from a synthetic resinous polymer.

3. A tubeless tire according to claim 2 wherein said warp and filling elements are formed from a vinyl resin.

4. A tubeless tire according to claim 2 wherein said warp and filling elements are formed from nylon.

5. In a pneumatic tubeless tire, a chafer strip of open-weave fabric having monofilament warp and filling elements of abrasion-resistant, air-impervious material, the intersecting portions of said elements being larger in width and smaller in depth than the total depth of said elements between the intersections to provide enlarged bearing surfaces at the intersections both on the outwardly facing side of said strip and between said elements.

6. A tubeless tire according to claim 5 wherein said warp and filling elements are formed from a synthetic resinous polymer.

7. A tubeless tire according to claim 6 wherein said warp and filling elements are formed from nylon.

8. An open-bead type pneumatic tire comprising a multi-ply carcass, a pair of bead grommets embedded in the radially inner edge portion of said carcass, and a chafer strip of open-weave fabric, the warp and filling elements of said fabric each comprising an air-impervious monofilament formed from a synthetic resinous polymer, the intersecting portions of said elements being larger in width and smaller in depth than the total depth of said elements between the intersections to provide enlarged bearing surfaces at the intersections both on the outwardly facing side of said strip and between said elements.

References Cited in the file of this patent

UNITED STATES PATENTS 2,749,959     Kunel     June 12, 1956

FOREIGN PATENTS 1,084,382     France     July 7, 1954